(12) United States Patent
Gupta et al.

(10) Patent No.: US 10,474,825 B1
(45) Date of Patent: Nov. 12, 2019

(54) CONFIGURABLE COMPUTE INSTANCE SECURE RESETS

(71) Applicant: Amazon Technologies, Inc., Seattle, WA (US)

(72) Inventors: Diwakar Gupta, Seattle, WA (US); Marcin Piotr Kowalski, Cape Town (ZA); Johannes Stephanus Jansen Van Rensburg, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 139 days.

(21) Appl. No.: 15/717,568

(22) Filed: Sep. 27, 2017

(51) Int. Cl.
*G06F 21/57* (2013.01)
*G06F 9/44* (2018.01)
*G06F 9/445* (2018.01)
*G06F 9/4401* (2018.01)

(52) U.S. Cl.
CPC .......... *G06F 21/575* (2013.01); *G06F 9/4406* (2013.01); *G06F 9/44505* (2013.01); *G06F 2221/034* (2013.01)

(58) Field of Classification Search
CPC ... G06F 21/575; G06F 9/4406; G06F 9/44505
See application file for complete search history.

(56) References Cited

U.S. PATENT DOCUMENTS

| 8,635,395 | B2* | 1/2014 | Colbert | G06F 9/45558 |
| | | | | 711/6 |
| 9,762,436 | B2* | 9/2017 | Puimedon | H04L 41/0803 |
| 9,817,685 | B2* | 11/2017 | Arcese | G06F 9/45558 |
| 9,936,014 | B2* | 4/2018 | Fang | H04L 67/1095 |

* cited by examiner

*Primary Examiner* — Stefan Stoynov
(74) *Attorney, Agent, or Firm* — Nicholson De Vos Webster & Elliott, LLP

(57) ABSTRACT

Techniques for configurable compute instance resets are described. A user can issue a request to securely reset one or more compute instances implemented within a service provider system. Each compute instance is reset to a previous point in time, such that any activity of the compute instance or effects thereof occurring since that point in time are completely eliminated. Each compute instance reset can include removing an existing volume of the compute instance, obtaining a volume, attaching the obtained volume to the compute instance, and rebooting the compute instance. Configuration data of the compute instance, such as an instance identifier or network addresses, can be maintained after the reset.

20 Claims, 11 Drawing Sheets

CONFIGURABLE COMPUTE INSTANCE SECURE RESETS

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to provide those services is dynamically scalable to meet the needs of the services at any given time. A user or customer often will rent, lease, or otherwise pay for access to resources provided in a service provider's system, and thus does not have to purchase and maintain the underlying hardware and/or software.

In this context, many cloud computing service providers utilize virtualization and multi-tenant architectures to allow multiple users to share its underlying hardware and/or software resources. Virtualization allows server end stations, storage devices, or other hardware resources to be partitioned into multiple isolated instances that can be assigned to and used by different users. Thus, multiple users can utilize the cloud computing provider's resources at a time, increasing the number of users a service provider can support, thus reducing the management and financial costs to both the service provider and its users.

BRIEF DESCRIPTION OF DRAWINGS

Various embodiments in accordance with the present disclosure will be described with reference to the drawings, in which.

DETAILED DESCRIPTION

Figure 1:
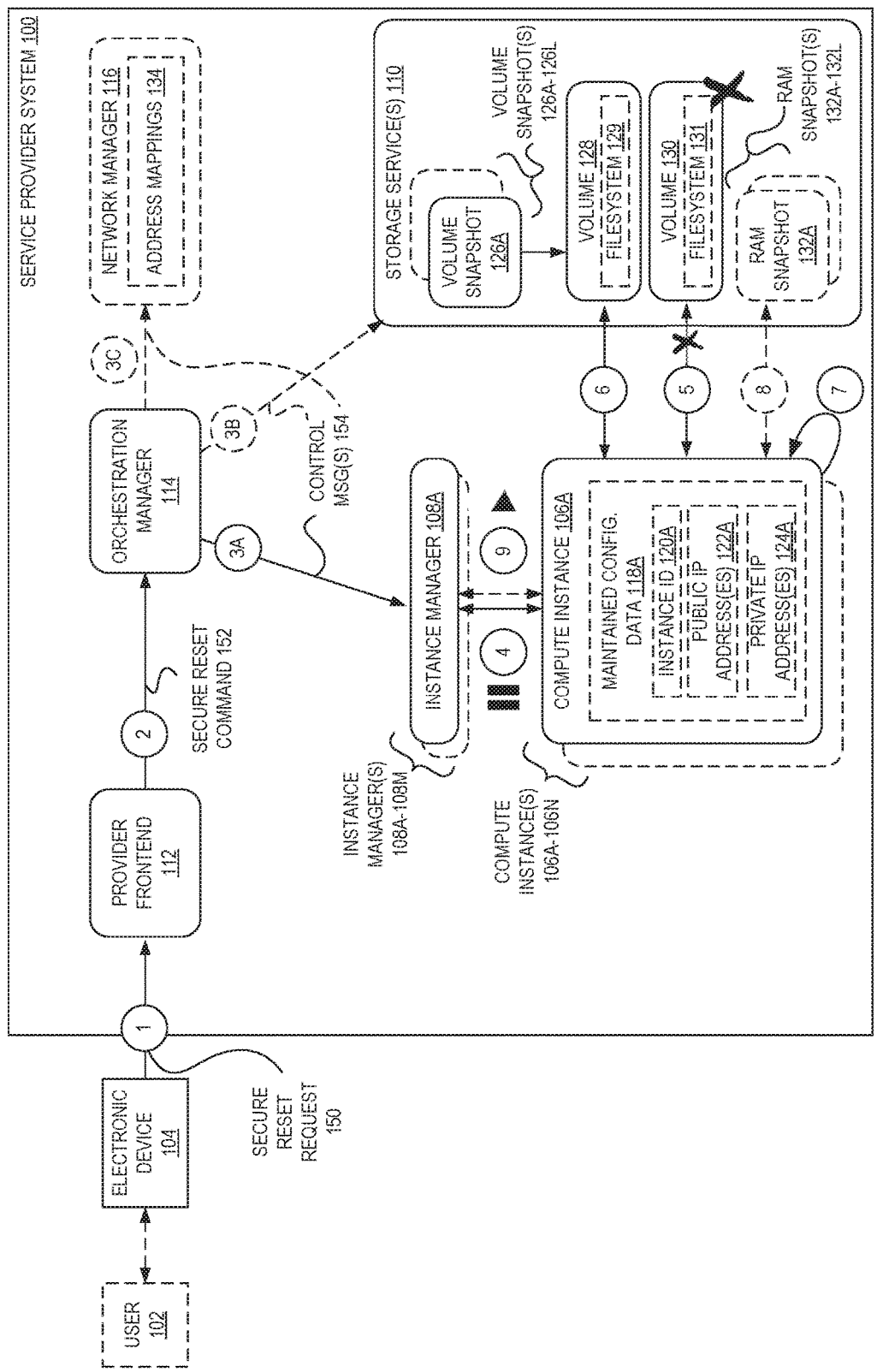
FIG. 1 is a block diagram illustrating a service provider system implementing configurable compute instance secure resets according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 106A-106Z, 132A-132L) may be used to indicate that there can be one or multiple instances of the referenced entity in some embodiments, though these multiple instances do not need to be identical but instead share some general traits or act in common ways. Further, the particular suffixes used are not meant to imply that a particular amount of the entity exists unless specifically indicated to the contrary, and thus two entities using common suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Users of service provider systems may operate for the benefit of different entities. An entity may be a formal or informal organization such as a business, non-profit, governmental unit, educational group, shared-interest group, union, collective, etc., and thus the user may act on behalf of (or as part of) the entity. However, an entity may also be an individual person. Within the context of the service provider system, an entity may establish an account (or possibly multiple accounts), where each account is associated with one or more users (or "user accounts").

Modern service provider systems provide users with the ability to utilize one or more of a variety of types of resources such as computing resources (e.g., executing virtual machine (VM) instances and/or containers, executing batch jobs, executing code without provisioning servers), data/storage resources (e.g., object storage, block-level storage, data archival storage), networking resources (e.g., configuring virtual networks including compute resources, content delivery networks, Domain Name Service (DNS)), application resources (e.g., databases, application build/deployment services), etc.

To provide these and other computing resource services, service provider systems rely upon virtualization techniques. Service provider systems, for example, may utilize virtualization to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic server device. Thus, a user may directly utilize a compute instance hosted by the service provider system to perform a variety of computing tasks, or may indirectly utilize a compute instance by submitting code to be executed by the service provider system, which in turn utilizes a compute instance to execute the code (typically without the user having any control of or knowledge of the underlying compute instance(s) involved).

For a variety of reasons, compute instances may become "dirty" from the perspective of a user or the service provider system. For example, a user may execute problematic software using a compute instance or change the configuration of a compute instance, such that the user may desire to reset all state of the compute instance and start over with a "fresh" compute instance. As another example, the service provider system may execute user-provided code using a compute instance, and for the sake of security, will not want to allow other users (or the service provider system itself) to utilize the same compute instance, which could have been purposefully or inadvertently—and possibly maliciously—changed by the initial code execution.

To address these scenarios, a service provider system could simply "reboot" a compute instance. However, while this approach could address some problems, other significant issues and problems continue to exist due to the fact that compute instance reboots only "reset" system state present in random access memory (RAM), and thus do not fix problems with the underlying state present in the file system/volumes used by the compute instance, such as misconfigured or erroneous system or configuration files, the existence of malware, etc.

Another approach that service provider systems can utilize to provide clean compute instance includes completely terminating the "dirty" compute instance, and instantiating a completely new compute instance using a "stock" (or approved) compute instance image. This approach is beneficial as the new compute instance insulates the user from any previous actions or effects of the dirty compute instance. However, this approach also has a significant drawback in that it is typically resource intensive to completely tear down a compute instance and instantiate a new compute instance, which can require a non-insignificant amount of time, processing resources, memory resources, network bandwidth, etc., which can be problematic in large service provider systems with many users and compute instances. For example, service provider systems may need to configure a new compute instance with a new instance identifier within the service provider system, new internal (or private) network addresses and/or external (or public) network addresses, new security configurations, new permissions, etc. As a result, the service provider system may need to provision (or track) such configuration information for the new compute instance, update its management records regarding the configuration information of the now-terminated compute instance, update routing/forwarding nodes within the service provider system to provide connectivity, etc. Moreover, when a compute instance is terminated and a new compute instance is instantiated by a user—in addition to waiting an amount of time—that user also often needs to modify its records (e.g., software configuration settings) to account for these new configuration values. Further, a termination and re-launch of a new compute instance may lead to the new compute instance being implemented in a different location, such as by a different server end station, which could be on a same or different rack, in a different data center or geographic location, etc., and thus the new compute instance may not be co-located with other resources of the user.

Accordingly, embodiments for configurable compute instance secure resets are described that can allow users (or the service provider system itself) to cause a secure "wipe" of a compute instance to "re-image" the instance and thus return it, functionally speaking, to an arbitrary point in time or to a known secure state. In some embodiments, a compute instance secure reset (or re-imaging) scrubs all system state since some point in time (e.g., when the compute instance booted)—e.g., RAM values, input/output (I/O) that the instance has performed to its attached volumes, etc. The secure reset can flexibly allow a requesting user or system to maintain some or all configuration data of the compute instance—e.g., public and/or private Internet Protocol (IP) addresses assigned to or utilized by the compute instance, an instance identifier used within the service provider system, security configurations (e.g., firewall rules), temporary credentials, assigned roles, etc. For example, a host and/or hypervisor that supports a compute instance may be able to use the same configuration data (e.g., an instance identifier, network mappings) both before and after the reset for the compute instance, as this information is in the possession of the host/hypervisor and can be reused as it wasn't changed or updated by the control plane. Thus, control plane entities of the service provider system are spared of the need to perform re-configurations (and the resulting time and resources) that would otherwise be required, the user can benefit from improved speed and ease of attaining a secure instance, potentially coupled with any desired configuration data being preserved.

In some embodiments, one or more secure resets are performed responsive to a user or service provider system component making an Application Programming Interface (API) call (or API request) to an API endpoint of the service provider system. The API call identifies one or multiple compute instances to be securely reset, and can identify service provider system configuration data values that are to be preserved after the secure reset(s). The API call may also identify one or more compute instance snapshots to be utilized for the secure reset that reflect a particular state that the one or more compute instances are to be reset to. The one or more compute instance snapshots may be previous snapshots of the particular computing instance(s) being reset, or may be independent from the particular computing instance(s). In some embodiments, a single API secure reset request can cause multiple computing instances to be securely reset.

Accordingly, in some embodiments, users of a service provider system who have workloads that require compute instances to be completely flushed can issue a request (e.g., an API call) to provide the same safety and security that would previously be obtained via terminating an instance and then launching a new instance, but in a fraction of the time. Furthermore, configuration data (e.g., an instance identifier of the compute instance) can be retained. Thus, some embodiments provide a lightweight ability to safely "flush" compute instances to support secure, scalable, and failure resilient enterprise class applications.

A variety of technical benefits result depending upon the implementation, including but not limited to reduced processing and/or network utilization in the service provider system, increased system security, reduced compute instance/application downtime, increased system scalability due to the reduction in processing and/or networking resources needed for compute instance cleansing of previous techniques, etc.

FIG. 1 is a block diagram illustrating a service provider system 100 implementing configurable compute instance secure resets according to some embodiments. The service provider system 100 implements one or more compute instances 106A-106N and also implements one or more (data) storage service(s) 110. The storage service(s) 110 may provide object storage, block-level storage, file-level storage, data archival storage, etc., and be made accessible to users/components outside the service provider system 100 and/or other services or components (e.g., compute instances 106A-106N) within the service provider system 100. The storage service(s) 110 provide data storage architecture to hold information used by a variety of applications and for a variety of purposes, such as "Big data" analytics, data warehouses, Internet of Things (IoT), database, backup, and archive applications.

In the example provided with regard to FIG. 1, the service provider system 100 implements one or more compute instances 106A-106N for a user 102, and the user 102 may configure the one or more compute instances 106A-106N to execute code and/or perform particular tasks as part of an application. The one or more compute instances 106A-106N may be executed by and/or controlled by one or more instance managers 108A-108M (e.g., a virtual machine manager (VMM), hypervisor, or other software and/or hardware control unit).

As shown, the user 102 uses an electronic device (e.g., a client end station, server end station or "server device") to issue a secure reset request 150 message (e.g., as an API call) at circle '1' to an API endpoint (not illustrated) of a provider frontend 112 of the service provider system 100. For example, the user 102 may utilize the electronic device 104 to view a website or application providing a portal (or "management console") that allows the user 102 to manage or control one or more resources provided by a service provider system 100. The user 102 may interact with the website or application (e.g., using some sort of user input/output component of the electronic device 104) to launch, modify/configure, or terminate a resource such as a compute instance, virtual network instance, data service instance, etc., or to manage the resources of the user. For the example, the user 102 may be presented a user interface allowing the user 102 to select one or more compute instances 106A-106N or a group of compute instances to be reset. The user 130B may then "submit" the request (e.g., via a webpage form by selecting a button or link), causing the electronic device 104 to transmit the secure reset request 150 message to the provider frontend 112. In some embodiments, the secure reset request 150 message is authenticated by the service provider system 100 to determine whether it was authentically generated by the apparent user, and in some embodiments the secure reset request 150 message is authorized by the service provider system 100 to determine whether the apparent user has sufficient privileges/permissions within the service provider system 100 to control secure resets of the compute instances 106A-106N.

In some embodiments, the secure reset request 150 comprises an API call including a command (e.g., "reimage-instances") and one or more parameters, such as a set of one or more compute instance identifiers corresponding to compute instances desired to be securely reset. Accordingly, in some embodiments, the secure reset request 150 message identifies one or more compute instances 106A-106N (or a collection or group of compute instances) that are to be reset. The secure reset request 150 may optionally also identify which snapshot (e.g., volume snapshot 126A—from one or more volume snapshots 126A-126L—and possibly an associated RAM snapshot 132A from one or more RAM snapshots 132A-132L) is to be used for the secure reset. For example, in some embodiments the service provider system 100 may generate periodic snapshots for a compute instance, generate a snapshot at a particular point in time upon a request from the user 102, or make available a set of snapshots that are "generic" in that they are not tied to the user 102 or the user's compute instances 106A-106N (e.g., are of a "generic" compute instance that can be used by different users of the service provider system 100). However, in some embodiments the secure reset request 150 does not identify a particular snapshot, in which case the service provider system can select a snapshot—e.g., a most-recently generated snapshot for the compute instance(s), a snapshot previously "flagged" or marked by the user to be used for secure resets, etc.

In some embodiments, the secure reset request 150 can include one or more parameters that specify a list of one or more block device mappings that identify one or more volumes. If one or more block device mappings are provided, the service provider system may, after the secure reset, attach one or more additional volumes to the securely reset compute instance that are identified by the block device mapping(s).

In some embodiments, the secure reset request 150 message identifies what type of secure reset is to be performed. For example, some embodiments can perform volume-based secure resets where each compute instance is securely reset to use a different volume, and some embodiments can perform volume and RAM-based secure resets where each compute instance is securely reset to use a different volume as well as a previous set of values of RAM.

The secure reset request 150 message, in some embodiments, indicates whether any configuration data 118A-118N is to be maintained across the secure resets, and may indicate which particular values of the configuration data 118A-118N are to be maintained. By maintaining configuration data 118A-118N, the control plane entities of the service provider system 100 and/or the control entities of an associated user's 102 system can be relieved of the burden of re-configuring and updating the configuration data 118A-118N in potentially multiple places, which may otherwise need to be done if the user 102 were to simply shut down the compute instance 106A and launch a new compute instance. Thus, embodiments can reduce the operational burden on such service provider system 100 "control plane" entities. For example, secure resets in some embodiments can primarily be performed with the orchestration manager 114 and the involved one or more server computing devices implementing the compute instances 106A and instance manager(s) 108A-108M, thus significantly or near-completely reducing the need to involve other control plane entities.

By way of example, in various embodiments the user 102 can select whether an instance identifier 120A (of a compute instance, within the context of the service provider system 100) is to be maintained after the secure reset, whether a public network address 122A (e.g., an Internet Protocol (IP) address that is routable outside of the service provider system 100) used by or assigned to the compute instance is to be maintained after the secure reset, whether a private network address 124A (e.g., IP address that is used only within the service provider system 100 and is not routable outside of the service provider system 100) used by or assigned to the compute instance is to be maintained after the secure reset, or whether one or more credentials (e.g., keys, passwords, etc.) utilized by the compute instance 106A within the service provider system 100 are to be maintained (or continue to be allowed to be used) after the secure reset, whether compute instance firewall rules (or "security groups") are to be maintained after the secure reset, whether virtual network mappings are to be maintained after the secure reset, etc. However, in some embodiments, one or more (or all) of these will be maintained after the secure reset without any need for the calling user to specify such.

In some embodiments, the secure reset request 150 message identifies one or more compute instances 106A-106N (or a collection or group of compute instances) as well as reset timing information indicating when a secure reset is to be performed. The reset timing information may directly identify one or more multiple particular times at which a secure reset is to be performed for the associated one or more compute instances 106A-106N, or may identify a recurring schedule (e.g., every four hours, once a day, once a week) when a secure reset is to be performed for the associated one or more compute instances 106A-106N.

The secure reset request 150 can be of a variety of formats and types based on the particular implementation of the service provider system 100. In some embodiments, the secure reset request 150 messages are HyperText Transfer Protocol (HTTP) request messages sent to an API endpoint of the service provider system 100, though many other types of commands can be utilized in other embodiments that are well-known to those of skill in the art. In some embodiments using an API, the API is a REpresentational State Transfer (REST) (or "RESTful") web service and thus the secure reset request 150 messages may adhere to a set of uniform, predefined stateless operations.

Upon receipt of the secure reset request 150 message, the provider frontend 112 (which may encompass the API endpoint), at circle '2', sends a secure reset command 152 to an orchestration manager 114. The secure reset command 152 in some embodiments is an HTTP message sent to an API of the orchestration manager 114, though in other embodiments other types of commands, messages, or communication techniques are employed. The orchestration manager 114 may be implemented using software, hardware, or a combination of both, to control—at least in part—the secure reset operations disclosed herein. The secure reset command 152 in some embodiments includes or is based on the secure reset request 150 message, such that the orchestration manager 114 can use it to identify one or more of the involved one or more compute instances 106A-106N, selected snapshots to be used, what type of secure reset is to be performed, timing information, etc.

Optionally at circle '2' (not illustrated), the provider frontend 112 may also send a response message to the caller (e.g., electronic device 104), indicating that one or more of a task identifier ("TaskId") for the secure reset, one or more instance identifier(s) ("InstanceId") that are being securely reset, a task state ("TaskState") indicating that the task is in progress, a start time ("StartTime") indicating when the task began, a completion time ("CompleteTime") if the task has completed, etc. With this information, the caller may monitor the status of the secure reset task by sending additional request messages (e.g., a "describe-reimage-tasks" API calls) with a parameter of one or more instance identifiers and/or one or more task identifiers (such as the "TaskId" returned in the response message as described herein), causing the service provider system to return responses indicating the status of the secure reset(s).

In some embodiments, the orchestration manager 114 sends, at circle '3A' and/or circle '3B' and/or circle '3C', one or more control messages 154 to perform the requested one or more secure resets. The one or more control messages 154 may be sent upon the orchestration manager 114 determining that the timing information of the secure reset request 150 message is satisfied at a particular point in time, or may be simply sent responsive to receipt of the secure reset command 152.

For example, at circle '3A' the orchestration manager 114 may transmit a first control message 154 to an instance manager 108A that manages (and/or executes) a compute instance 106A identified by the secure reset request 150 message. In some embodiments, the orchestration manager 114 includes a hypervisor or VMM that executes the compute instance 106A, though in some embodiments the orchestration manager 114 includes a volume manager module (which may execute within a compute instance itself) that can attach volumes to and/or detach volumes from the compute instance 106A.

At circle '4', the instance manager 108A causes the compute instance 106A to be paused (and thus made non-operational for a period of time). The instance manager 108A then, at circle '5', causes the volume 130 including the file system 131 that the compute instance 106A is currently using to be detached/removed. As shown, in some embodiments the volume 130 is provided by a separate storage service 110 within the service provider system 100 and thus may potentially be physically located at one or more different electronic server devices, which may or may not be physically distinct from the electronic server device (or "host") implementing the compute instance 106A; however, in other embodiments this is not the case. In some embodiments, this volume 130 is destroyed or eliminated from existence within the service provider system 100, and thus it may not be returned to in such cases.

At circle '6', the instance manager 108A causes a different volume 128 with filesystem 129 to be attached to the compute instance 106A. The different volume 128 may be created based on a volume snapshot 126A, which can be one of potentially multiple volume snapshots 126A-126L.

Figure 2:
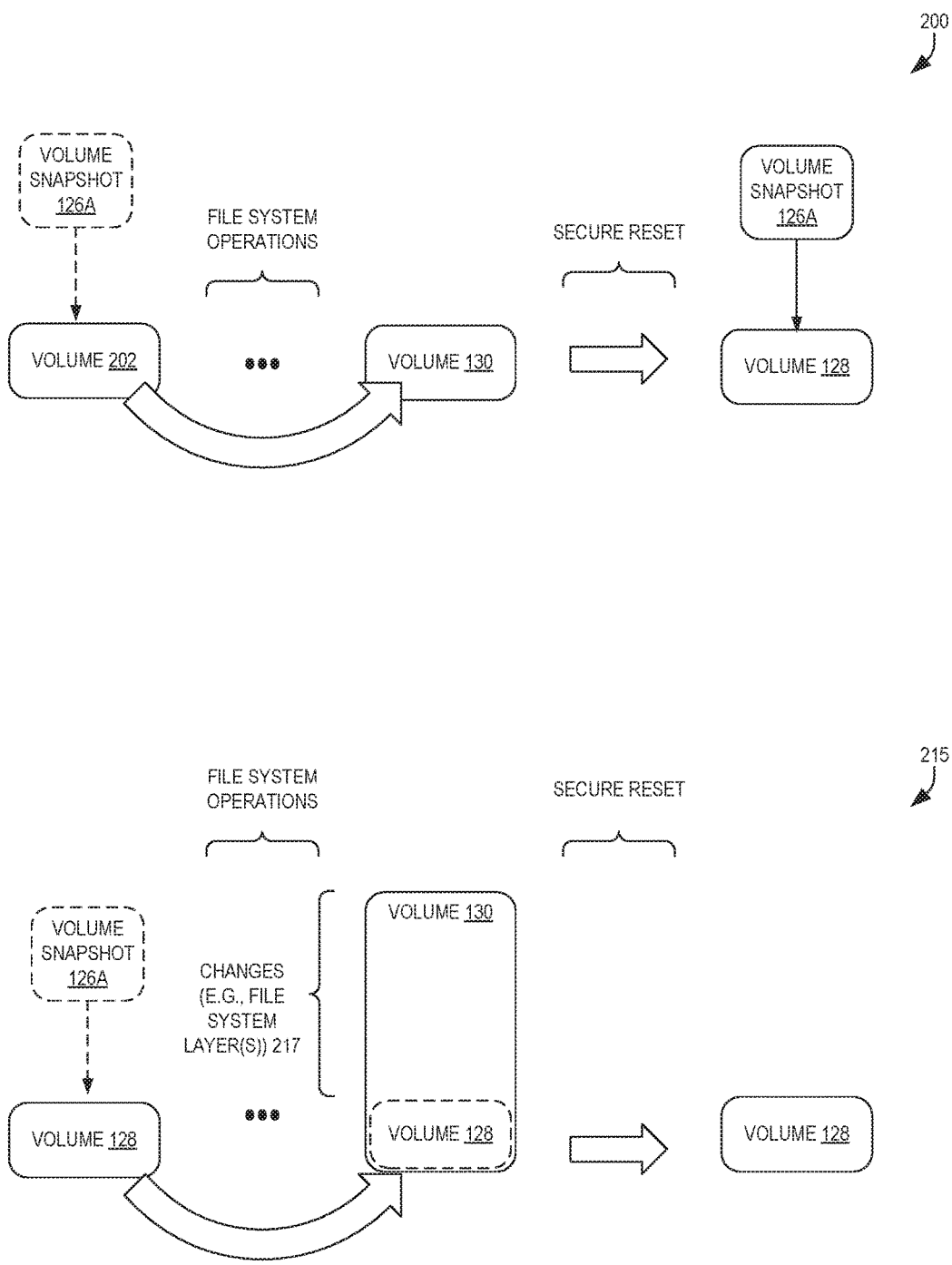
FIG. 2 illustrates exemplary configurations for the use and secure resets of volumes according to some embodiments.

For greater detail regarding volume 130 and/or volume 128, FIG. 2 illustrates exemplary configurations for the use and secure resets of volumes according to some embodiments. A first example configuration 200 is shown at the top of FIG. 2 that reflects a case where an initial volume 202 is used by a compute instance. This volume 202 may have been created based on a volume snapshot 126A. Over the course of operation, file system operations (e.g., the writing of files, deletion of files, etc.) of the compute instance cause some or all of volume 202 to change to thus become volume 130. (Technically speaking, both volume 202 and volume 130 may be a same volume used by the compute instance; however, because the data of the volume has changed over time, we refer to it herein as being different.) Upon performing a secure reset, the volume 130 can be detached (and deleted) from the service provider system (as shown in FIG. 1 with regard to circle '5'), and a "new" volume 128 can again be attached to the compute instance. This new version of the initial volume 128 may be created using volume snapshot 126A.

A second example configuration 215 shown at the bottom of FIG. 2 reflects a scenario in which an initial volume 128 (e.g., possibly created using a volume snapshot 126A) again is modified over the course of operation of a compute instance to yield volume 130. However, in this case, as volume 128 is changed, these changes 217 are stored separate from the initial volume 128, and these changes 217 can be discarded to revert the volume 128 to eliminate the impact of changes 217. For example, the changes 217 may be a set of file system layers that represent/reflect the changes made to the volume 128 over time, and thus the volume 130 may essentially still utilize the core initial volume 128 to some extent. The changes 217 may be stored at a physically distinct device or location than the initial volume 128, may be kept in volatile memory, etc. In some embodiments, the initial volume 128 is configured as read-only and cannot be changed by a user compute instance. To perform the secure reset, the set of changes 217 can be deleted (or otherwise eliminated, de-referenced, etc.) to result in the original volume 128 "again" being attached to the compute instance.

Turning back to FIG. 1, the instance manager 108A may cause the compute instance 106A to be rebooted at circle '7', causing the compute instance 106A to start utilizing the volume 128. In some embodiments, at circle '8' the instance manager 108A may cause a RAM snapshot 132A corresponding to the volume snapshot 126A to be loaded into the RAM area of the compute instance 106A. This may also include obtaining (e.g., from storage service(s) 110) and inserting a status flag register snapshot corresponding to the RAM snapshot 132A to be inserted into a status flag register of the (virtual) processor of the compute instance 106A. At circle '9', the instance manager 108A may resume (or un-pause) the compute instance 106A, at which point the compute instance 106A is again operational.

In some embodiments, the orchestration manager 114 may send one or more control messages 154 at circle '3B' to the storage service(s) 110 to implement the volume detach and/or volume attach operations described with regard to circle '5' and circle '6'. For example, the one or more control messages 154 could instruct the storage service(s) 110 to treat a particular volume (e.g., volume 128) as read-only and thus store any changes (from operations of compute instances) separately so that they can be discarded, or instruct the storage service(s) 110 to discard volume changes, etc.

Additionally or alternatively, the orchestration manager 114 may send one or more control messages 154 at circle '3C' to a network manager 116. The network manager 116 can be implemented in software, hardware, or a combination of both, and may be tasked with maintaining network address information within the service provider system (e.g., in a set of address mappings 134). In some embodiments, such as when a network address of a compute instance is not desired to be maintained across a secure reset, the orchestration manager 114 may instruct the network manager 116 via control message(s) 154 at circle '3C' to update the address mappings 134 for a compute instance 106A upon it being restarted. Similarly, if other types of configuration data 118A are not to be maintained across a secure reset (e.g., as indicated by the secure reset request 150), the orchestration manager 114 may similarly communicate with other "control plane" type entities (not illustrated) of the service provider system 100 to cause the corresponding configuration data value(s) to be one or more of updated, released, invalidated, etc.

Although the particular set of operations shown in FIG. 1 are used in some embodiments, in other embodiments different entities may perform different ones of the operations illustrated. For example, in some embodiments the orchestration manager 114 may cause the volume detach/attach operations shown with regard to circle '5' and circle '6', the RAM snapshot operations shown with regard to circle '8', etc.

Figure 3:
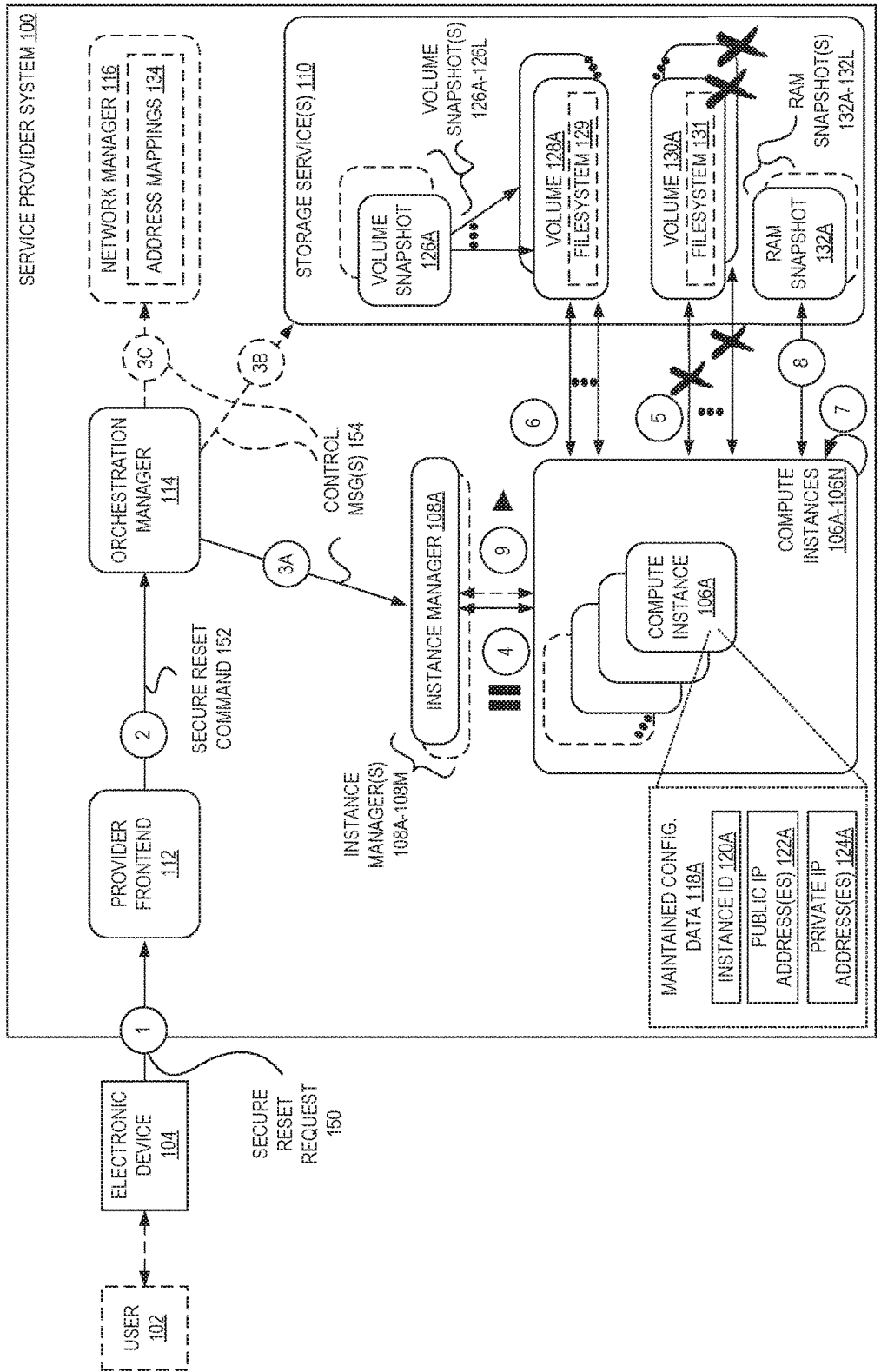
FIG. 3 is a block diagram illustrating a service provider system providing configurable secure resets for a fleet of compute instances according to some embodiments.

As indicated above, embodiments can perform secure resets for multiple compute instances 106A-106N, e.g., on behalf of one user, and/or responsive to a single secure reset request 150 message. To this end, FIG. 3 is a block diagram illustrating a service provider system providing configurable secure resets for a fleet of compute instances according to some embodiments. In some cases, a user 102 may cause multiple compute instances 106A-106N to be implemented to perform a common function in the service provider system 100. For example, multiple compute instances (e.g., ten, fifty, one-hundred, etc.) could be implemented as identical (or near identical) web servers, application servers, etc., to implement a website, provide a backend for another application, perform processing tasks, etc. In this case, it may be useful to periodically (e.g., once an hour, once every day, once a week, etc.) perform a secure reset of some or all of the fleet of compute instances to ensure that they are "refreshed" to a known good state, or to eliminate the possibility of vulnerabilities from being able to be exploited over a period of time, etc.

Figure 4:
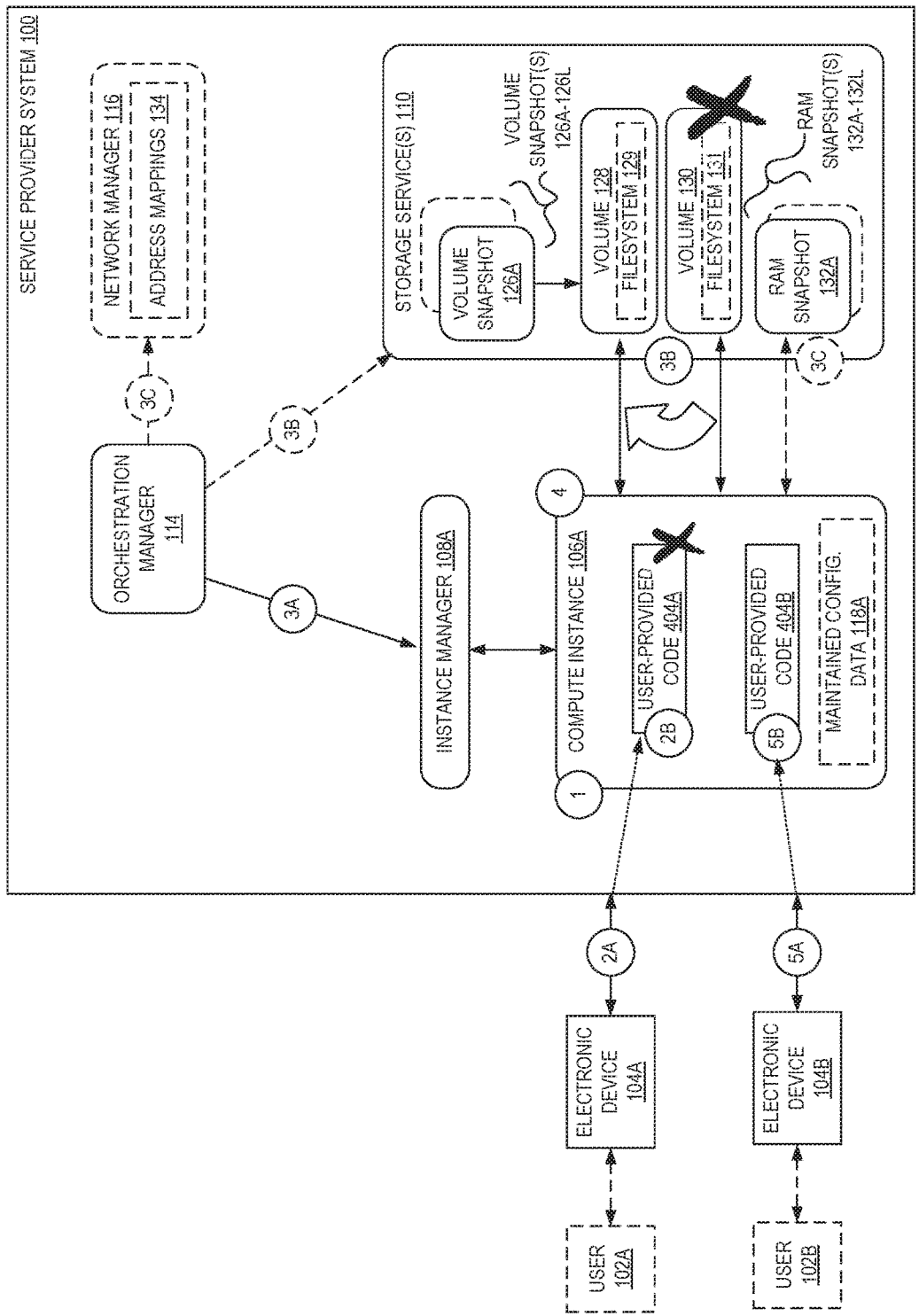
FIG. 4 is a block diagram illustrating a service provider system utilizing configurable compute instance secure resets according to some embodiments.

Another useful scenario for utilizing secure resets is shown in FIG. 4, which is a block diagram illustrating a service provider system utilizing configurable compute instance secure resets. In some embodiments, a service provider system can perform secure resets for its own purposes, e.g., not responsive to a particular secure reset request issued on behalf of a user.

For example, an exemplary service provider system 100 may provide a serverless code execution service that allows users to submit requests to have the service provider system 100 execute user-provided code (e.g., a program, routine, subroutine) without the user needing to specifically acquire and configure compute capacity (e.g., compute instances), deploy the code, execute the code, etc.

A service provider system, to provide such a serverless code execution service, may instantiate at circle '1' a pool of compute instances (e.g., compute instance 106A-106N) that are available for user code execution, and upon receiving a request from a user to execute code, causes one or more of the compute instances to execute the user code. For example, a first user 102A may submit a request at circle '2A' to execute user-provided code 404A, and the service provider system selects the compute instance 106A to execute the code 404A.

Upon the conclusion of the execution of the user-provided code 404A at circle '2B', the compute instance 106A may be viewed as "dirty" because it has been utilized—and potentially modified—by the user 102A. Thus, a service provider system could terminate the compute instance 106A and instantiate a new compute instance to be placed back into the pool for code execution purposes. However, as described earlier herein, the termination and instantiation of compute instances is typically extremely expensive from a resource standpoint—e.g., the termination and instantiation takes significant processing time, and there is also significant messaging between various control plane entities, such as management and recordkeeping services, within the service provider system to configure the involved compute instances.

However, in some embodiments, the service provider system 100, instead of destroying and rebuilding compute instances for serverless code execution, performs a secure reset of the compute instance 106A (at circle '4') to remove all dirty state (e.g., volume 130 and/or RAM) and replace it with clean state (e.g., volume 128 and/or RAM snapshot 132A). Thus, with such a secure reset, there is absolutely no chance that side effects from the previous code executed by the compute instance 106A (e.g., user-provided code 404A) could impact the execution at circle '5B' of new user-provided code 404B provided by a second user 102B at circle '5A', as any changes that may have been made to the compute instance 106A have been completely eliminated, and the compute instance 106A can effectively be changed back into a known clean state.

In some embodiments, a service provider system 100 can perform secure resets for other purposes. As one example, a service provider system 100 may implement compute instances 106A-106N that themselves execute containers (e.g., that are available for use by users). Upon the end of the need for these containers, instead of completely terminating the underlying compute instance(s), the service provider system 100 may simply perform a secure reset for each compute instance to quickly return the compute instance to a known secure and "clean" state, without needing to perform potentially substantial reconfiguration operations associated with destroying a compute instance and launching (and configuring) a new compute instance.

Figure 5:
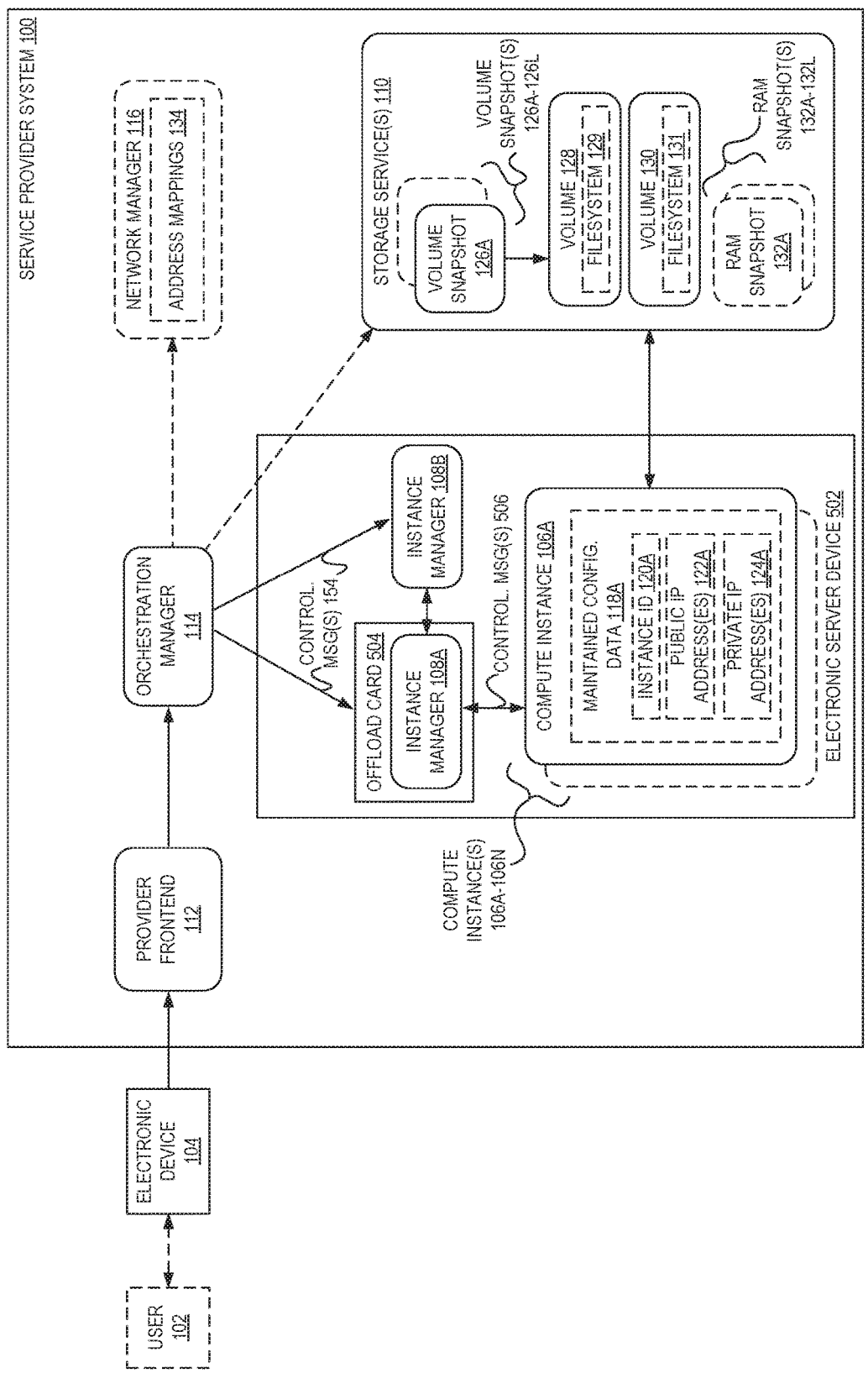
FIG. 5 is a block diagram illustrating a service provider system including an offload card of an electronic server device implementing an instance manager for performing at least some operations for configurable compute instance secure resets according to some embodiments.

FIG. 5 is a block diagram illustrating a service provider system 100 including an offload card 504 of an electronic server device 502 implementing an instance manager 108B for performing at least some operations for configurable compute instance secure resets according to some embodiments.

As illustrated, an offload card 504 is utilized to implement an instance manager 108B that can perform virtualization-related operations, including some or all operations described herein as being performed by instance manager(s) 108A-108M.

In some embodiments, virtual machine management occurs using partially-offloaded instance managers 108A-108M (e.g., instance manager 108B) at virtualization hosts (e.g., electronic service device 502). A given virtualization host may include one or more primary physical central processing units (CPUs), which may include multiple cores and a main memory (e.g., RAM), in addition to various other hardware components for networking, etc. As is known to those of skill in the art, to support guest compute instances (e.g., VMs) on behalf of various users, virtualized versions of the CPUs and/or portions of the main memory may be created and allocated to guest compute instances by components of an instance manager 108A. The term "partially-offloaded" may be used herein to describe instance managers where at least some of the virtualization management tasks required for supporting guest compute instances on the electronic server device may not be executed using the primary CPUs or cores of the virtualization host, but instead such tasks may be designated as "offloaded" tasks, reducing the virtualization management-related overhead on the physical CPUs of the electronic server device 502. Instead, one or more processors located on an offload card 504 (e.g., a card accessible from the primary CPU(s) via a bus implementing a version of the Peripheral Component Interconnect—Express (PCI-E) standard, or other interconnects such as a QuickPath interconnect (QPI) or UltraPath interconnect (UPI)) may implement an instance manager 108A to be employed for at least some of the offloaded tasks in various embodiments. The offload card 504 may be referred to as a network card, as it may have one or multiple physical network interfaces that couple with electronic server device 502 to other devices (e.g., switches, server devices) of the service provider system 100.

The offload card 504 may implement an instance manager 108A to perform some or all of the described operations of the instance managers 108A-108M disclosed herein. For example, the instance manager 108A implemented by the offload card 504—possibly upon a request from the other instance manager 108B—may perform (e.g., via issuing API calls) the pausing and/or unpausing of compute instances, perform memory transfer/copying operations for generating snapshots and/or attaching or removing volumes, etc., via control messages 506, which may be sent to one or more compute instances 106A-106N.

Figure 6:
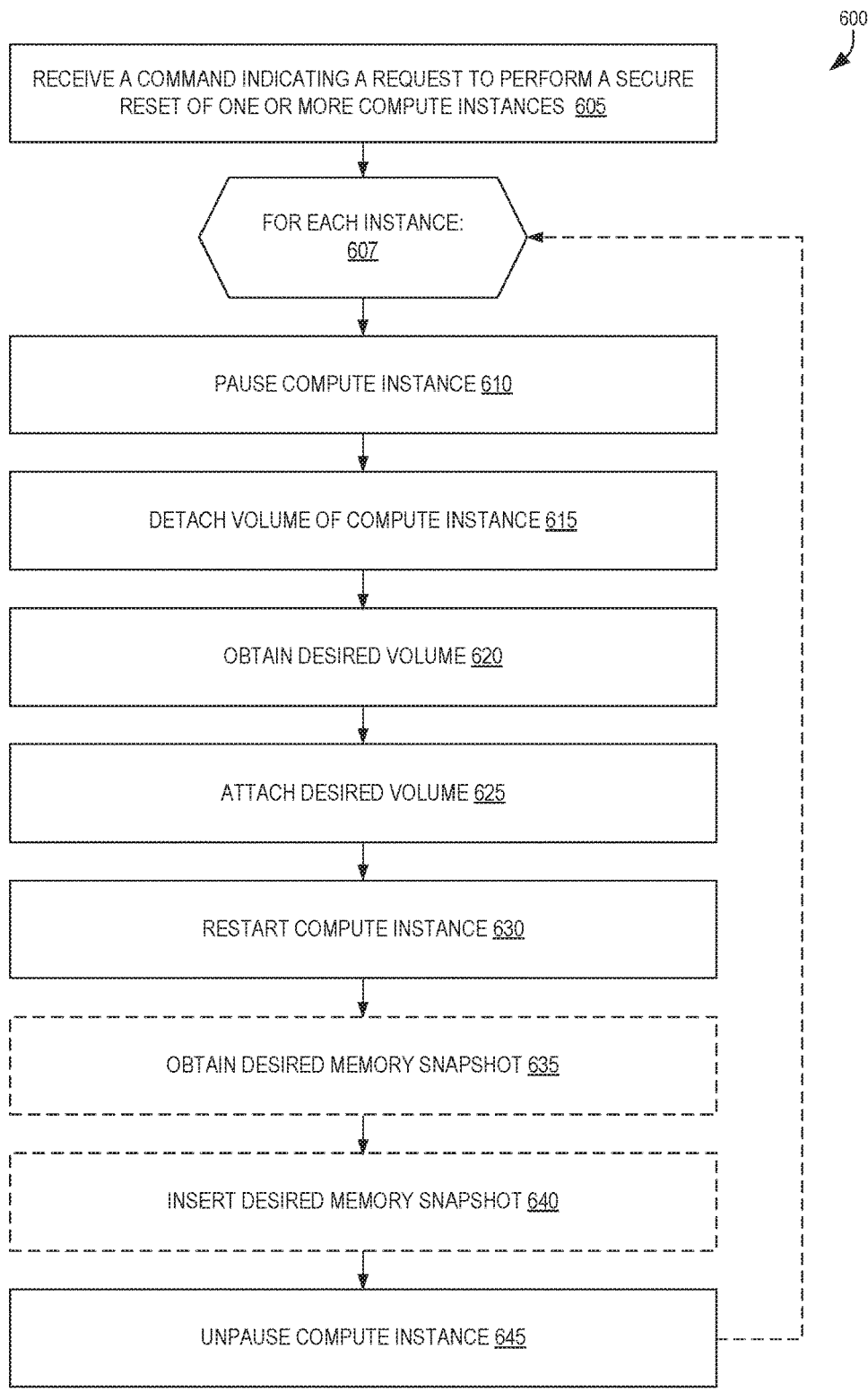
FIG. 6 is a flow diagram illustrating operations for configurable compute instance secure resets according to some embodiments.

FIG. 6 is a flow diagram illustrating operations 600 for configurable compute instance secure resets according to some embodiments. Some or all of the operations 600 (or any other processes described herein, or variations, and/or combinations thereof—such as operations 700, operations 800, etc.) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising instructions executable by one or more processors. The computer-readable storage medium is non-transitory. In some embodiments, one or more of the operations 600 are performed by the orchestration manager 114 and/or instance manager 108A of the other figures.

The operations 600 include, at block 605, receiving a command indicating a request to perform a secure reset of one or more compute instances. The command may comprise the secure reset command of FIG. 1, and block 605 may be performed by an orchestration manager. The request may identify one compute instance, multiple compute instances, or a group (or "pool" of compute instances). The request may identify one or more particular snapshot volumes that the compute instances are to be securely reset to, timing information indicating when the secure reset(s) is to occur, whether any configuration data is to be maintained during the secure reset, which types of configuration data are to be maintained, etc.

The operations 600 include, at block 607, performing the following for each instance. In some embodiments, block 610-645 are performed at least partially in parallel for two or more of the compute instances, and in some embodiments single blocks (e.g., block 610) may be performed at least partially in parallel. For example, in some embodiments where multiple compute instances are to be securely reset, all compute instances may be paused (at block 610) before the operations 600 continue to block 615, though in other embodiments this is not the case.

The operations 600 include, at block 610, pausing the compute instance. Block 610 can be performed by the instance manager 108A. The operations 600 also include, at block 615, detaching a volume of the compute instance, obtaining a desired volume at block 620, and attaching the desired volume to the compute instance at block 625. In some embodiments, the desired volume is obtained by creating a new volume through use of a snapshot previously taken of the compute instance (or that is completely independent from the compute instance), which may be identified by the received command.

The operations 600 also include, at block 630, restarting the compute instance, and optionally at block 635, obtaining a desired memory (or RAM) snapshot and optionally inserting the desired memory snapshot at block 640 for the compute instance. The desired memory snapshot may correspond to the volume attached at block 625.

The operations 600 also include, at block 645, unpausing the compute instance, thus making the compute instance operational again.

Other embodiments can perform some or all of these operations in a different order, non-sequentially, etc. For example, in some embodiments, block 620 and/or block 635 can be performed earlier in the flow, and/or may be performed in parallel—e.g., in parallel with block 610 and/or block 615, etc.

Figure 7:
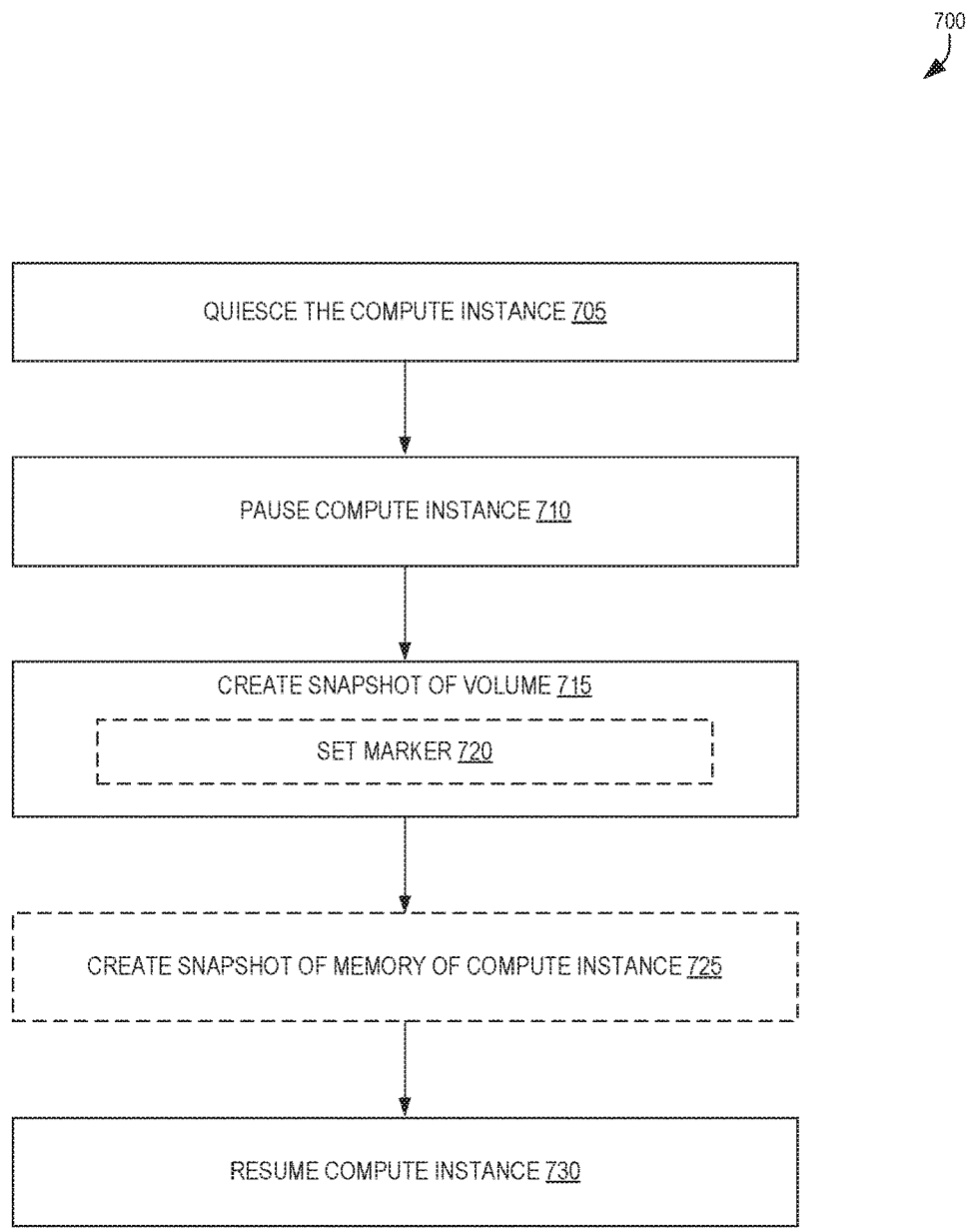
FIG. 7 is a flow diagram illustrating operations for generating snapshots that can be utilized for configurable compute instance secure resets according to some embodiments.

FIG. 7 is a flow diagram illustrating operations 700 for generating snapshots that can be utilized for configurable compute instance secure resets according to some embodiments. In some embodiments, operations 700 are performed by the orchestration manager 114 and/or instance manager 108A of the other figures. In some embodiments, the operations 700 can be performed periodically for a compute instance—e.g., once a day, once every six hours—which can provide the user a number of different recent states that the compute instance can be securely reset back to.

The operations 700 include, at block 705, quiescing the compute instance. In some embodiments, block 705 includes one or more of: flushing dirty buffers from the operating system's in-memory cache to disk (e.g., its storage volume), allowing existing processing tasks to be completed by the compute instance, preventing new tasks from being performed by the compute instance, waiting an amount of time to allow any network connections to terminate, etc.

At block 710, the operations include pausing (or suspending) the compute instance, and at block 715, creating a snapshot of the volume. In some embodiments, creating a snapshot of the volume includes setting a marker (or pointer) at block 720 to identify a particular location in storage that represents a point in time for the snapshot, which may be performed when the storage service(s) 110 is utilizing file system layering techniques or other journaled or transactional storage technique. Alternately, in some embodiments, creating the snapshot may include copying an existing volume to another storage location, etc.

In some embodiments, the operations 700 optionally further include, at block 725, creating a snapshot of the memory of the compute instance. In some embodiments, the contents of the RAM is persisted in storage at one point in time. However, in some embodiments, block 725 can be performed at least in part earlier in the set of operations 700—e.g., before block 705, during block 705, etc. For example, in some embodiments the content of the memory can be persisted to storage at one of these alternate points, and at block 725 only those areas of the memory that have changed (since the time of the persisting) need to be persisted, thus reducing the overall time that the compute instance remains paused (between block 710 and block 730). In some embodiments, block 725 also includes creating a status flag register snapshot of the status flag register of the compute instance, the content of which can be persisted and loaded into the status flag register of the compute instance during a secure reset utilizing the corresponding memory snapshot and volume snapshot to more accurately place the compute instance into as close of an original state as possible.

At block 730, the operations 700 include resuming (or un-pausing) the compute instance.

Figure 8:
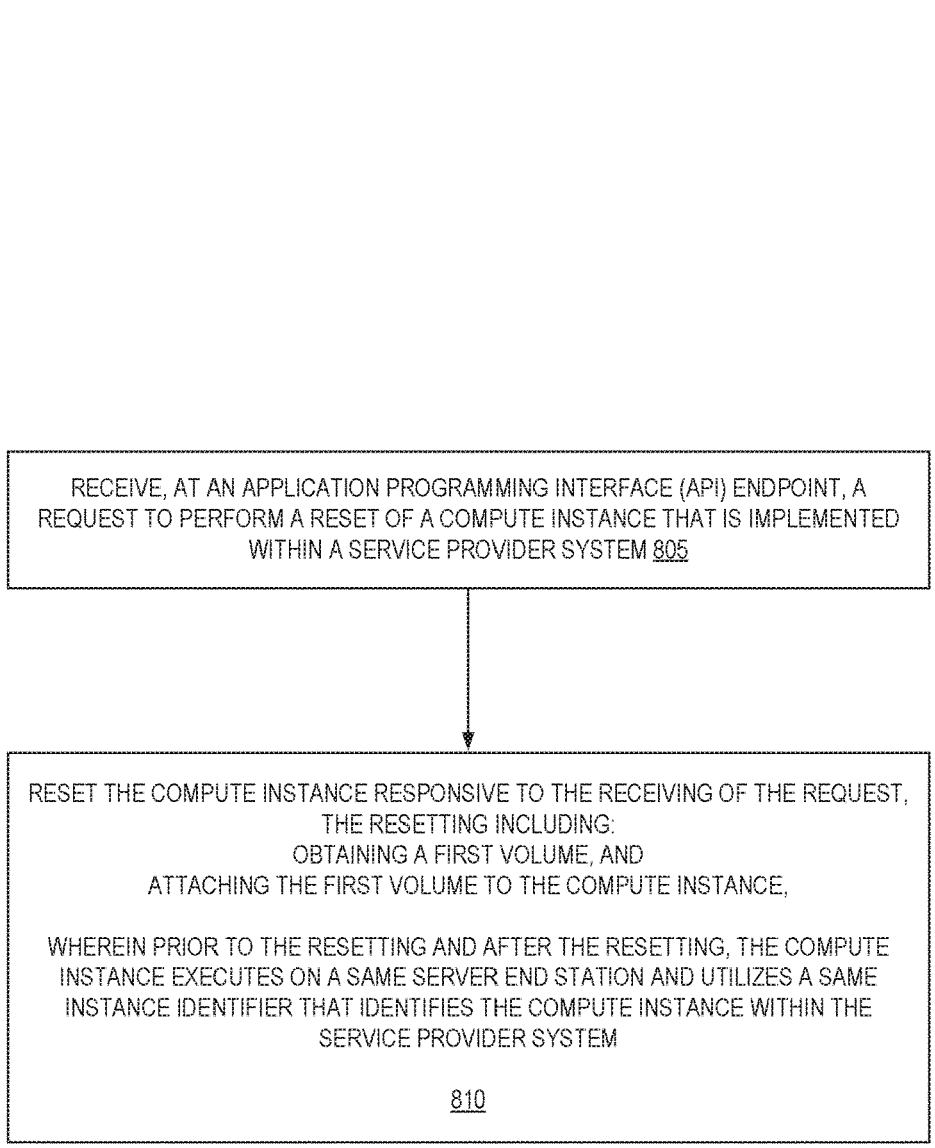
FIG. 8 is a flow diagram illustrating operations for configurable compute instance secure resets according to some embodiments.

FIG. 8 is another flow diagram illustrating operations 800 for configurable compute instance secure resets according to some embodiments. In some embodiments, operations 800 are performed by the orchestration manager 114 and/or instance manager 108A of the other figures.

The operations 800 include, at block 805, receiving, at an API endpoint, a request to perform a secure reset of a compute instance that is implemented within a service provider system. The request may be received at a provider frontend described herein, and may have been sent across one or more networks (e.g., the Internet) from an electronic device of a user. The compute instance may be implemented for the benefit of the user. The request may be carried as a payload of an HTTP request message.

The operations 800 also include, at block 810, resetting the compute instance responsive to the receiving of the request. The resetting includes obtaining a first volume, and attaching the first volume to the compute instance. Prior to the resetting and after the resetting, the compute instance executes on a same server end station and utilizes a same instance identifier that identifies the compute instance within the service provider system. In some embodiments, after the resetting of the compute instance, a second volume used by the compute instance prior to the reset no longer exists within the service provider system.

In some embodiments, obtaining the first volume includes creating a volume based on a volume snapshot. In some embodiments, obtaining the first volume may include deleting a set of changes to a volume, where the set of changes are stored in a volatile memory, and the set of changes collectively with the volume were previously used by the compute instance as a volume.

In some embodiments, block 810 further comprises obtaining a memory snapshot of a volatile memory of the compute instance that was generated consistently with a generation of the first volume, and loading the memory snapshot to act as the volatile memory of the compute instance. Obtaining the memory snapshot can include, for example, retrieving the memory snapshot from a storage service of the service provider system.

In some embodiments, the request to perform the secure reset identifies a volume snapshot to be used to generate the first volume and further identifies the compute instance.

In some embodiments, the request is to further perform one or more additional secure resets of one or more other compute instances implemented within the service provider system, and the operations 800 further include resetting the one or more other compute instances further responsive to the receiving of the request. In some embodiments, the first volume is generated using a volume snapshot, where the one or more other compute instances are reset to utilize one or more volumes generated using the volume snapshot.

In some embodiments, the operations 800 further include generating, for computing instance, a plurality of snapshots of the second volume of the compute instance over an amount of time, and the request identifies one of the plurality of snapshots that corresponds to the first volume.

In some embodiments, the operations 800 further include executing a first code on a second compute instance having an attached third volume generated based on a snapshot, where the first code was provided by a first user, and the executing of the first code causes content of the third volume to be changed; and resetting the second compute instance after the executing of the first code, where the resetting includes attaching a fourth volume generated based on the snapshot to the second compute instance; and executing a second code on the second compute instance.

In some embodiments, the request indicates that a network address utilized by the compute instance is to be maintained after the secure reset of the compute instance, and prior to the resetting and also after the resetting, the compute instance utilizes the same network address. In some embodiments, the network address is a private network address (e.g., a private, non-globally routable IP address). In some embodiments, the network address is a public network address (e.g., a globally-routable IP address).

In some embodiments, the second volume, at a point in time previous to the receiving of the request, was equivalent to the first volume; the second volume comprises the first volume and a set of changes stored in a volatile memory; and the obtaining of the first volume comprises deleting the set of changes.

At least some operations, in some embodiments, for resetting the compute instance are controlled by an offload processing card that is distinct from one or more processors that execute the compute instance.

Figure 9:
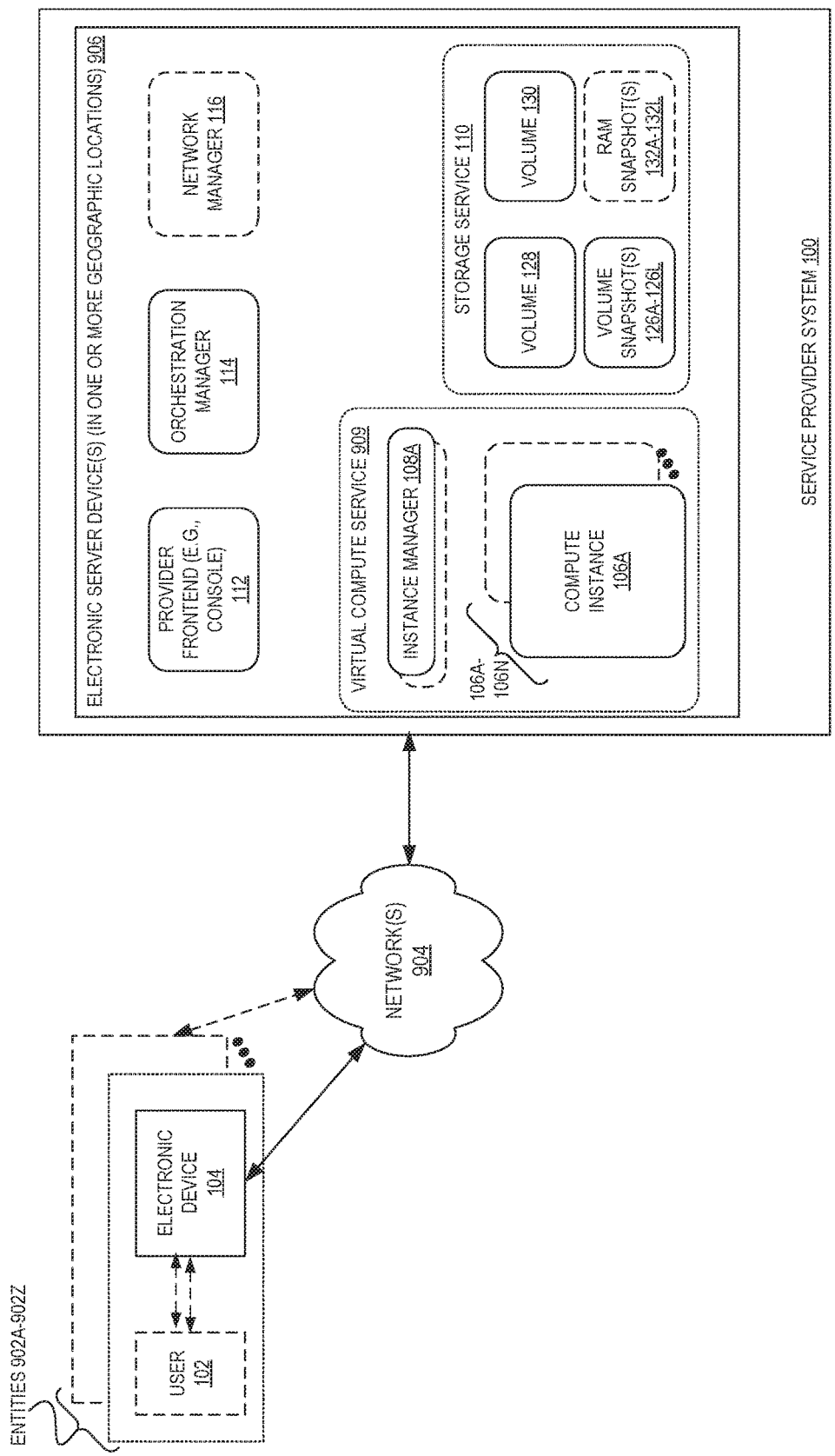
FIG. 9 is a block diagram illustrating example deployment implementations of components of an environment implementing configurable compute instance secure resets according to some embodiments.

FIG. 9 is a block diagram illustrating example deployment implementations of components of an environment implementing configurable compute instance secure resets according to some embodiments.

In some embodiments, the user 102 may be part of an entity 902 (e.g., an organization) and may operate an electronic device 104 of the entity 902 and/or within a network of the entity 902. The electronic device 104 may be used to issue the secure reset request 150 messages described herein. The electronic device 104 may be an electronic client device described in additional detail later herein.

The environment may further include one or more electronic server devices 902B that implement an external security service 312B. The one or more electronic server devices 902B may be within a network of an entity 902, or located in a different location and/or operate in a different network.

Devices of the entity 902 may connect via one or more public networks 904 (e.g., the Internet) to the service provider system 100. The service provider system 100 can include one or more electronic server devices 906, which may be located in multiple geographic locations. The one or more electronic server devices 906 implement one or more software entities, including but not limited to the provider frontend 112, orchestration manager 114, and/or network manager 116.

The one or more electronic server devices 906 also implement a virtual compute service 909 providing one or more compute instances 106A-106N (e.g., VMs, containers). The one or more electronic server devices 906 also implement one or more data storage services 110. The data storage service 110 is shown as including multiple volumes 128/130, one or more volume snapshots 126A-126L, and one or more RAM snapshots 132A-132L.

Although not illustrated, the one or more electronic server devices 906 in some embodiments also implement an authentication service that performs authentication operations, e.g., for determining whether requests are authentically originated by particular users/accounts, and/or an authorization service that performs authorization operations for determining whether particular requests are authorized to be performed.

Figure 10:
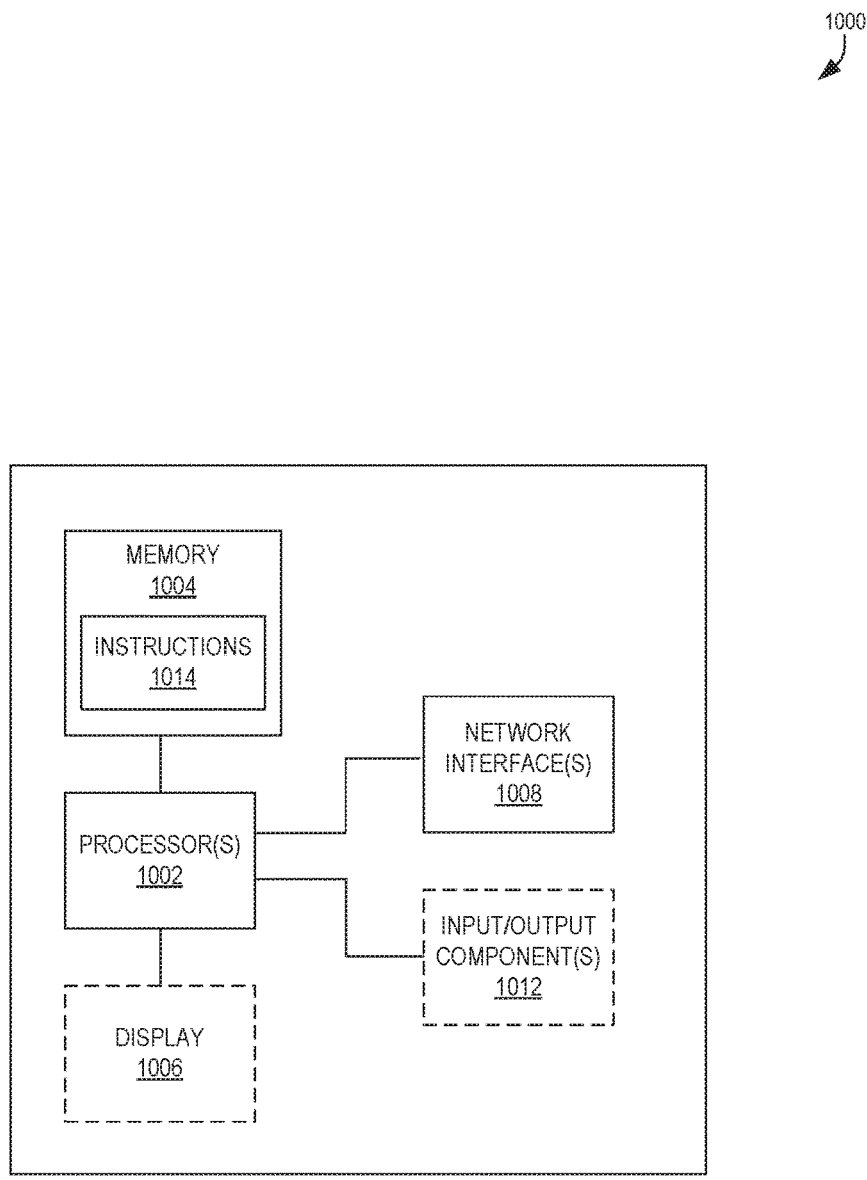
FIG. 10 illustrates a logical arrangement of a set of general components of an exemplary computing device that can be utilized in accordance with various embodiments.

FIG. 10 illustrates a logical arrangement of a set of general components of an example computing device 1000 such as electronic device 104, electronic server device(s) 906, etc. Generally, a computing device 1000 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1002 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1004) to store code (e.g., instructions 1014) and/or data, and a set of one or more wired or wireless network interfaces 1008 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1004) of a given electronic device typically stores code (e.g., instructions 1014) for execution on the set of one or more processors 1002 of that electronic device. One or more parts of various embodiments may be implemented using different combinations of software, firmware, and/or hardware.

A computing device 1000 can include some type of display element 1006, such as a touch screen or liquid crystal display (LCD), although many devices such as portable media players might convey information via other means, such as through audio speakers, and other types of devices such as server end stations may not have a display element 1006 at all. As discussed, some computing devices used in some embodiments can include at least one input and/or output component(s) 1012 able to receive input from a user. This input component can include, for example, a push button, touch pad, touch screen, wheel, joystick, keyboard, mouse, keypad, or any other such device or element whereby a user can input a command to the device. In some embodiments, however, such a device might be controlled through a combination of visual and/or audio commands and utilize a microphone, camera, sensor, etc., such that a user can control the device without having to be in physical contact with the device.

Figure 11:
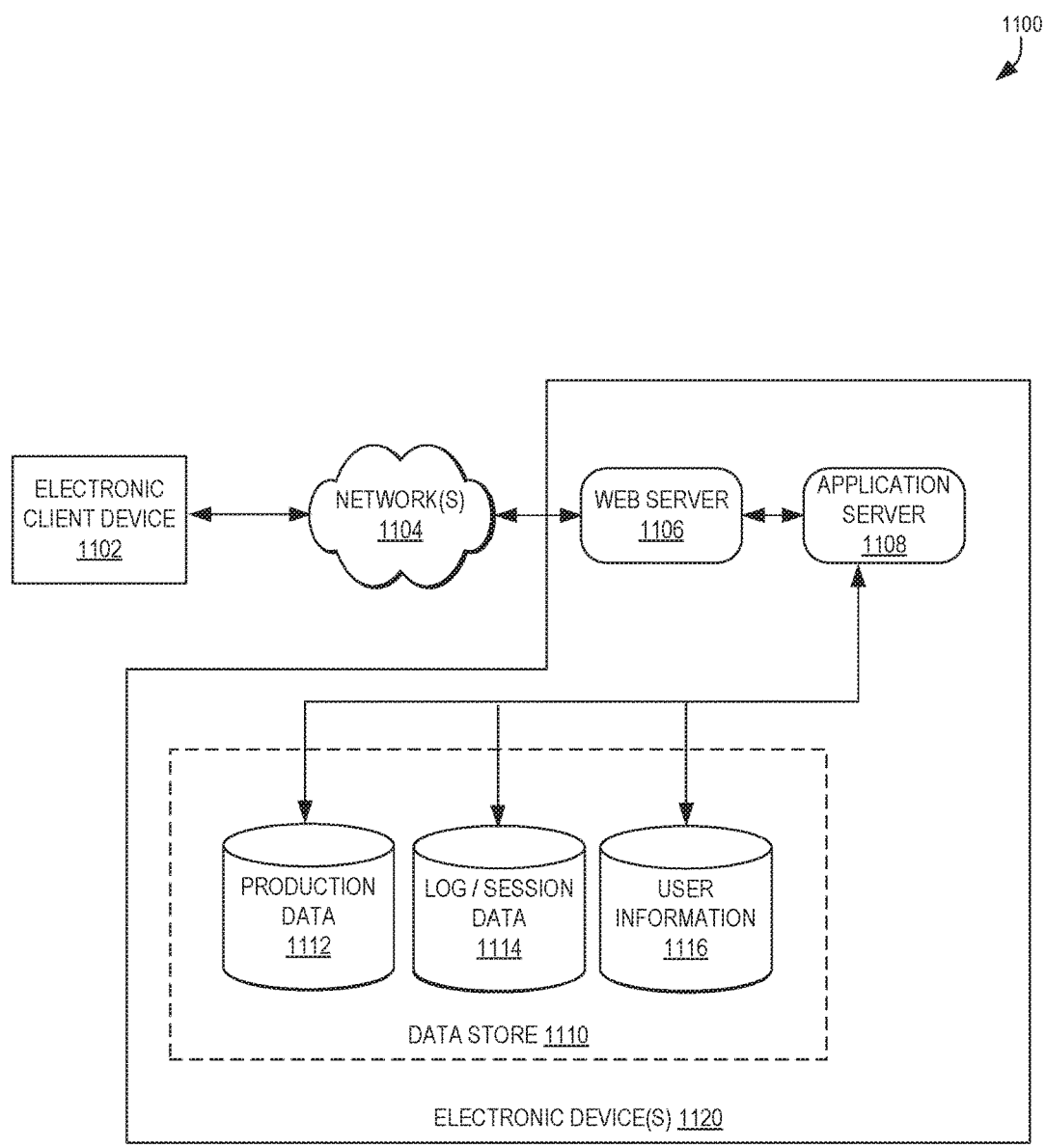
FIG. 11 illustrates an example of an environment for implementing aspects in accordance with various embodiments.

As discussed, different approaches can be implemented in various environments in accordance with the described embodiments. For example, FIG. 11 illustrates an example of an environment 1100 for implementing aspects in accordance with various embodiments. For example, in some embodiments the secure reset request 150 messages are HTTP requests that are received by a web server (e.g., web server 1106), and the users 102 via electronic client devices 1102 may interact with the service provider system 100 (e.g., to manage resources) via a web portal provided via the web server 1106 and application server 1108. As will be appreciated, although a web-based environment is used for purposes of explanation, different environments may be used, as appropriate, to implement various embodiments. The system includes an electronic client device 1102, which may also be referred to as a client end station and can be any appropriate device operable to send and receive requests, messages or information over an appropriate network 1104 (e.g., network(s) 904) and convey information back to a user of the device 1102. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1104 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1104 includes the Internet, as the environment includes a web server 1106 for receiving requests and serving content in response thereto, although for other networks an alternative device serving a similar purpose could be used, as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device 1102 and handling a majority of the data access and business logic for an application. The application server 1108 provides access control services in cooperation with the data store 1110 and is able to generate content such as text, graphics, audio, video, etc., to be transferred to the client device 1102, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1102 and the application server 1108, can be handled by the web server 1106. It should be understood that the web server 1106 and application server 1108 are not required and are merely example components, as structured code discussed herein can be executed on any appropriate device or host machine as discussed elsewhere herein.

The data store 1110 can include several separate data tables, databases, or other data storage mechanisms and media for storing data relating to a particular aspect. For example, the data store illustrated includes mechanisms for storing production data 1112 and user information 1116, which can be used to serve content for the production side. The data store 1110 also is shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update, or otherwise process data in response thereto. In one example, a user might submit a search request for a certain type of item. In this case, the data store 1110 might access the user information 1116 to verify the identity of the user and can access a production data 1112 to obtain information about items of that type. The information can then be returned to the user, such as in a listing of results on a web page that the user is able to view via a browser on the user device 1102. Information for a particular item of interest can be viewed in a dedicated page or window of the browser.

The web server 1106, application server 1108, and/or data store 1110 may be implemented by one or more electronic devices 1120, which can also be referred to as electronic server devices or server end stations, and may or may not be located in different geographic locations. Each of the one or more electronic devices 1120 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the environment 1100 in FIG. 11 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network, a wide-area network, a virtual private network, the Internet, an intranet, an extranet, a public switched telephone network, an infrared network, a wireless network, and any combination thereof.

In embodiments utilizing a web server, the web server can run any of a variety of server or mid-tier applications, including HTTP servers, FTP servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as RAM or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, at an Application Programming Interface (API) endpoint, a request to perform a secure reset of one or more compute instances that are implemented within a service provider system; and
   resetting the one or more compute instances responsive to the receiving of the request,
      the resetting including, for each of the one or more compute instances,
         removing a first volume utilized by the compute instance,
         obtaining, based at least on the request, a second volume, and
         attaching the second volume to the compute instance,
      wherein prior to the resetting and after the resetting, each of the one or more compute instances executes on a same server device, utilizes a same instance identifier that identifies the compute instance within the service provider system, and further utilizes a same network address within the service provider system.

2. The computer-implemented method of claim 1, wherein the resetting, for each of the one or more compute instances, further comprises:
   obtaining a memory snapshot of a volatile memory that was generated consistently with a generation of the second volume; and
   loading the memory snapshot to act as the volatile memory of the compute instance.

3. The computer-implemented method of claim 1, further comprising:
   generating, for at least one compute instance of the one or more compute instances, periodic snapshots of a current volume of the at least one compute instance to yield a plurality of snapshots, wherein the request identifies one of the plurality of snapshots that corresponds to the second volume.

4. A computer-implemented method comprising:
   receiving, at an Application Programming Interface (API) endpoint, a request to perform a reset of a compute instance that is implemented within a service provider system; and
   resetting the compute instance responsive to the receiving of the request, the resetting including,
      obtaining a first volume, and
      attaching the first volume to the compute instance, wherein prior to the resetting and after the resetting, the compute instance executes on a same server device and utilizes a same instance identifier that identifies the compute instance within the service provider system.

5. The computer-implemented method of claim 4, wherein the resetting further comprises:
   obtaining a memory snapshot of a volatile memory that was generated consistently with a generation of the first volume; and
   loading the memory snapshot to act as the volatile memory of the compute instance.

6. The computer-implemented method of claim 4, wherein the request to perform the reset identifies a volume snapshot to be used to generate the first volume and further identifies the compute instance.

7. The computer-implemented method of claim 4, wherein the request is to further perform one or more additional resets of one or more other compute instances implemented within the service provider system, the method further comprising resetting the one or more other compute instances further responsive to the receiving of the request.

8. The computer-implemented method of claim 7, wherein the first volume is generated using a volume snapshot, and wherein the one or more other compute instances are reset to utilize one or more volumes generated using the volume snapshot.

9. The computer-implemented method of claim 4, further comprising:
   generating, for the compute instance, a plurality of snapshots of a second volume of the compute instance over an amount of time, wherein the request identifies one of the plurality of snapshots that corresponds to the first volume.

10. The computer-implemented method of claim 4, further comprising:
    executing a first code on a second compute instance having an attached second volume generated based on a snapshot, the first code being provided by a first user, wherein the executing of the first code causes content of the second volume to be changed;
    resetting the second compute instance after the executing of the first code, wherein the resetting includes attaching a third volume generated based on the snapshot to the second compute instance; and
    executing a second code on the second compute instance.

11. The computer-implemented method of claim 4, wherein:
    the request indicates that a network address utilized by the compute instance is to be maintained after the reset of the compute instance; and
    prior to the resetting and also after the resetting, the compute instance utilizes the network address.

12. The computer-implemented method of claim 4, wherein:
    a second volume that was attached to the compute instance that, at a point in time previous to the receiving of the request, was equivalent to the first volume;
    the second volume, upon the receiving of the request, comprises the first volume and a set of changes stored in a volatile memory; and
    the obtaining of the first volume comprises deleting the set of changes.

13. The computer-implemented method of claim 4, wherein at least some operations for resetting the compute instance are controlled by an offload processing card that is distinct from one or more processors that execute the compute instance.

14. A system comprising:
    a compute instance implemented by a first one or more electronic devices of a service provider system; and
    an orchestration manager implemented by a second one or more electronic devices of the service provider system that, upon a receipt of a request to perform a reset of the compute instance, is to:
      reset the compute instance responsive to the receipt of the request, the reset including,
        obtaining a first volume, and
        attaching the first volume to the compute instance,
        wherein prior to the reset and after the reset of the compute instance, the compute instance executes on a same electronic device and utilizes a same instance identifier that identifies the compute instance within the service provider system.

15. The system of claim 14, wherein the reset further comprises:
    obtaining a memory snapshot of a volatile memory that was generated consistently with a generation of the first volume; and
    loading the memory snapshot to act as the volatile memory of the compute instance.

16. The system of claim 15, wherein the request to perform the reset identifies a volume snapshot to be used to generate the first volume and further identifies the compute instance.

17. The system of claim 14, wherein the request is to further perform one or more additional resets of one or more other compute instances implemented by the first one or more electronic devices, and wherein the orchestration manager is further to reset the one or more other compute instances responsive to the receipt of the request.

18. The system of claim 17, wherein the first volume is generated using a volume snapshot, and wherein the one or more other compute instances are reset to utilize one or more volumes generated using the volume snapshot.

19. The system of claim 14, wherein the orchestration manager is further to:
    generate, for the compute instance, a plurality of snapshots of a second volume of the compute instance, wherein the request identifies one of the plurality of snapshots that corresponds to the first volume.

20. The system of claim 14, wherein the orchestration manager is further to:
    reset a second compute instance after an execution of a first code on the second compute instance, the first code being provided by a first user,
    wherein the second compute instance was attached to a second volume generated using a first volume snapshot before the execution of the first code,
    wherein the executing of the first code causes content of the second volume to be changed,
    wherein the reset causes a third volume generated using the first volume snapshot to be attached to the second compute instance, and
    wherein the second compute instance maintains a same second instance identifier before the reset and after the reset, the second instance identifier identifying the second compute instance within the service provider system.

* * * * *